United States Patent
Weismantel et al.

(10) Patent No.: US 8,497,336 B2
(45) Date of Patent: Jul. 30, 2013

(54) METHOD FOR MANUFACTURING WATER-ABSORBING POLYMER PARTICLES WITH A LOW CENTRIFUGE RETENTION CAPACITY

(75) Inventors: Matthias Weismantel, Jossgrund-Oberndorf (DE); Rüdiger Funk, Niedernhausen (DE); Ronny De Kaey, Mortsel (BE); Karl J. Possemiers, Gravenwezel (BE)

(73) Assignee: BASF SE, Ludwigshafen (DE)

( * ) Notice: Subject to any disclaimer, the term of this patent is extended or adjusted under 35 U.S.C. 154(b) by 236 days.

(21) Appl. No.: 12/920,403

(22) PCT Filed: Mar. 16, 2009

(86) PCT No.: PCT/EP2009/053030
§ 371 (c)(1),
(2), (4) Date: Aug. 31, 2010

(87) PCT Pub. No.: WO2009/115472
PCT Pub. Date: Sep. 24, 2009

(65) Prior Publication Data
US 2011/0015362 A1    Jan. 20, 2011

(30) Foreign Application Priority Data
Mar. 20, 2008 (EP) .................... 08153136

(51) Int. Cl.
*C08F 2/00* (2006.01)
*C08F 220/06* (2006.01)
*C08F 20/06* (2006.01)

(52) U.S. Cl.
USPC ............. 526/317.1; 526/318.5; 526/88

(58) Field of Classification Search
USPC ................. 526/317.1, 318.5, 88
See application file for complete search history.

(56) References Cited

U.S. PATENT DOCUMENTS

| 6,710,141 B1 | 3/2004 | Heide et al. |
| 7,393,908 B2 | 7/2008 | Heide et al. |
| 2004/0186229 A1 | 9/2004 | Heide et al. |
| 2006/0204755 A1* | 9/2006 | Torii et al. ............ 428/402 |
| 2008/0004408 A1* | 1/2008 | Stueven et al. ............ 526/88 |

FOREIGN PATENT DOCUMENTS

| DE | 199 55 861 A1 | 5/2001 |
| WO | WO-0232964 A2 | 4/2002 |
| WO | WO 2004069915 A1 * | 9/2004 |
| WO | WO-2006/034806 A1 | 4/2006 |
| WO | WO 2006034806 A1 * | 4/2006 |

OTHER PUBLICATIONS

Buchholz et al., Modern Superabsorbent Polymer Technology, pp. 71-103 (1998).
International Search Report from corresponding International Application No. PCT/EP2009/053030, dated Jun. 22, 2009.

* cited by examiner

*Primary Examiner* — Michael M Bernshteyn
(74) *Attorney, Agent, or Firm* — Marshall, Gerstein & Borun LLP

(57) ABSTRACT

A process for producing water-absorbing polymer particles with a low centrifuge retention capacity by polymerizing in a continuous kneading reactor under an inert gas volume flow of at most 10 m$^3$/h per m$^3$ of reactor volume.

15 Claims, No Drawings

METHOD FOR MANUFACTURING WATER-ABSORBING POLYMER PARTICLES WITH A LOW CENTRIFUGE RETENTION CAPACITY

CROSS-REFERENCE TO RELATED APPLICATIONS

This is the U.S. national phase of International Application No. PCT/EP2009/053030, filed Mar. 16, 2009, which claims the benefit of European Patent Application No. 08153136.0, filed Mar. 20, 2008.

The present invention relates to a process for producing water-absorbing polymer particles with a low centrifuge retention capacity (CRC) by polymerizing in a continuous kneading reactor under an inert gas volume flow of at most 10 m$^3$/h per m$^3$ of reactor volume.

The production of water-absorbing polymer particles is described in the monograph "Modern Superabsorbent Polymer Technology", F. L. Buchholz and A. T. Graham, Wiley-VCH, 1998, pages 71 to 103.

DE 34 32 690 A1 discloses a process for continuously producing water-absorbing polymer particles, in which water-soluble monomers are polymerized in the presence of a crosslinker and of initiators in a reactor which is equipped with a multitude of rotating stirrer shafts arranged parallel to one another, which are provided with stirrer blades. The polymerization is performed continuously in a kneading reactor with at least two axially parallel shafts. In this reactor type, such strong backmixing takes place that the monomer solution is added to the finely divided water-containing polymer gel and the polymerization of the monomer proceeds on the surface of the polymer gel. The water-absorbing polymer particles thus producible have a relatively high residual monomer content.

EP 0 223 063 A2 teaches a process for continuously producing water-absorbing polymer particles in a single-shaft kneading reactor whose mixing segments have the effect of conveying the substances in axial direction from the start to the end of the kneading reactor.

WO 2001/038402 A1 and WO 2003/022896 A1 disclose a process for continuously producing water-absorbing polymer particles to a kneading reactor with at least two axially parallel shafts, wherein the reaction mixture is transported in axial direction through the kneading reactor.

Water-absorbing polymers are used to produce diapers, tampons, sanitary napkins and other hygiene articles, but also as water-retaining agents in market gardening.

It was an object of the present invention to provide an improved process for producing water-absorbing polymer particles with a low centrifuge retention capacity (CRC).

The object was achieved by a process for producing water-absorbing polymer particles by polymerizing a monomer solution or suspension comprising
a) at least one ethylenically unsaturated monomer which bears acid groups and may be at least partly neutralized,
b) at least one crosslinker,
c) at least one initiator,
d) optionally one or more ethylenically unsaturated monomers copolymerizable with the monomers specified under a) and
e) optionally one or more water-soluble polymers,
in a continuous kneading reactor with at least two axially parallel shafts under an inert gas stream, wherein the inert gas volume flow is at most 10 m$^3$/h per m$^3$ of reactor volume and the homogeneously crosslinked water-absorbing polymer particles (base polymer) obtained by the polymerization have a centrifuge retention capacity (CRC) of at most 38 g/g.

Base polymer refers to unpostcrosslinked water-absorbing polymer particles.

The homogeneously crosslinked water-absorbing polymer particles (base polymer) obtainable by the process according to the invention have a centrifuge retention capacity (CRC) of preferably at most 37 g/g, preferentially at most 36.5 g/g, more preferably at most 36 g/g, most preferably 35.5 g/g. The centrifuge retention capacity (CRC) of the water-absorbing polymer particles is typically at least 20 g/g. The centrifuge retention capacity is determined by the EDANA (European Disposables and Nonwovens Association) recommended test method No. WSP 241.2-05 "Centrifuge Retention Capacity", wherein the water-absorbing polymer particles have been dried before the determination down to a water content of less than 5% by weight and comminuted to a particle size in the range from 150 to 850 µm.

The centrifuge retention capacity (CRC) can be set to the desired value by means of adjustment of the amount of crosslinker b). The centrifuge retention capacity (CRC) is, however, also influenced by the degree of neutralization of the monomer a) and the recycling of undersize, i.e. a low degree of neutralization or the recycling of more undersize lower the centrifuge retention capacity (CRC).

The inert gas volume flow is preferably from 0.001 to 5 m$^3$/h per m$^3$ of reactor volume, preferentially from 0.01 to 2.5 m$^3$/h per m$^3$ of reactor volume, more preferably from 0.1 to 2 m$^3$/h per m$^3$ of reactor volume, most preferably from 0.2 to 1 m$^3$/h per m$^3$ of reactor volume.

The inert gas used is preferably nitrogen, particularly in technical grade quality.

Technical grade nitrogen comprises typically at least 99.8% by volume of nitrogen and less than 0.0005% by volume of oxygen. The use of water vapor as an inert gas is likewise possible.

The present invention is based on the finding that the kneading reactor can be inertized by using a significantly lower inert gas volume flow than is customary to date. The process according to the invention therefore enables considerable savings of inert gas. Too low an inert gas volume flow in the production of water-absorbing polymer particles with a high centrifuge retention capacity (CRC) leads, in contrast, to a disturbed reaction profile and to an increased power consumption of the kneader shafts.

It is thus, for example, possible in the production of water-absorbing polymer particles with a high centrifuge retention capacity (CRC), i.e. more than 38 g/g, to regulate the power consumption of the kneader shafts and hence the reaction via the inert gas volume flow.

The inert gas volume flow can also be conveyed into the kneading reactor entirely or partly together with the monomer solution or suspension via a common feed line.

In a preferred embodiment of the present invention, redox initiators are used, in which case the reducing agent is preferably metered into the kneading reactor separately from the monomer solution or suspension.

The water-absorbing polymer particles are produced by polymerizing a monomer solution or suspension and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0530 438 A1, di- and triacrylates, as described in EP 0547 847 A1. EP 0559 476 A1, EP 0632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Preferred crosslinkers b) are pentaerythrityl triallyl ether, tetraalloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably from 0.05 to 1.5% by weight, more preferably from 0.1 to 1% by weight, most preferably from 0.3 to 0.6% by weight, based in each case on monomer a). With rising crosslinker content, the centrifuge retention capacity (CRC) falls and the absorption under a pressure of 21.0 g/cm$^2$ (AUL0.3 psi) passes through a maximum.

The initiators c) may be all compounds which generate in free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Bruggolite® FF6 and Brüggolite® FF7 (Bruggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acid, preferably starch, starch derivatives and modified cellulose.

Typically, an aqueous monomer solution is used. The water content of the monomer solution is preferably from 40 to 75% by weight, more preferably from 45 to 70% by weight, most preferably from 50 to 65% by weight. It is also possible to use monomer suspensions, i.e. oversaturated monomer solutions. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to from 0.1 to 0.3 ppm by weight.

Kneading reactors usable in the process according to the invention are, for example, obtainable from List AG, Arisdorf, Switzerland and are described in CH 0 664 704 A5, EP 0 517 068 A1, WO 97/12666 A1, DE 21 23 956 A1, EP 0 603 525 A1, DE 195 36 944 A1 and DE 41 18 884 A1.

Such kneading reactors with two shafts achieve, by virtue of the arrangement of the kneading and transport elements, a high level of self-cleaning, which is an important requirement for a continuous polymerization. The two shafts preferably rotate counter to one another. Suitable kneading and transport elements are, for example, close-clearance mixing bars and L- or U-shaped attachments.

The reaction can also be carried out under reduced pressure at from 100 to 800 mbar, especially from 200 to 600 mbar.

The kneading reactor can be heated or cooled if required. The monomer solution or suspension is polymerized therein at a temperature in the range of preferably from 0 to 140° C., more preferably from 30 to 120° C., most preferably from 50 to 100° C.

Preference is given to performing the process according to the invention in such a way that the proportion of the heat removal through evaporation of water from the reaction mixture, based on the heat of reaction, is at least 5%, more preferably at least 15%, most preferably at least 20%.

Additionally preferred are process variants in which the proportion of heat removal through the product discharge, based on the heat of reaction, is preferably at least 25%, preferentially at least 45%, most preferably at least 55%.

Preference is given to processes in which the proportion of heat removal through evaporation of water from the reaction mixture and the proportion of heat removal through the product discharge, based on the heat of reaction, in total, is preferably at least 50%, more preferably at least 70%, most preferably at least 90%.

However, it is also possible to remove some of the heat via the heat of dissolution of a solid neutralizing agent, such as sodium hydrogencarbonate.

In a very particularly preferred process variant, the inner wall of the reactor and at least one shaft, preferably all shafts, of the kneading reactor are cooled.

The polymer gel obtained in the polymerization typically has a residual monomer content of from 3000 to 6000 ppm by weight.

The preparation process is notable for low residence times in the reactor and hence a good space-time yield. For instance, even in the case of residence times below 30 minutes with a reactor volume of 500 l, water-absorbing polymer particles with a high monomer conversion are found. Particular preference is given to process variants with a high mass throughput, which enables residence times below 20 minutes and even below 15 minutes.

The time until the peak temperature is attained in the process according to the invention is preferably 5 minutes and more preferably in the range from 2 to 4 minutes. The optimum with regard to throughput in the reactor and product quality lies within this range (low level of agglomerates, good residual monomer values, etc.).

Thereafter, the polymer gel leaving the kneading reactor can be stored in a delay vessel at temperatures of preferably from 50 to 120° C., more preferably from 80 to 100° C. The delay time is preferably from 3 minutes to 3 hours, more preferably from 5 to 30 minutes. The vessel may be a vessel open at the top, but a closed vessel is also possible, to which a gentle vacuum is applied.

The acid groups of the resulting polymer gels have typically been partially neutralized. Neutralization is preferably carried out at the monomer stage. This is typically done by mixing in the neutralizing agent as an aqueous solution or preferably also as a solid. The degree of neutralization is preferably from 25 to 95 mol %, more preferably from 30 to 80 mol %, most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then preferably dried with a belt dryer until the residual moisture content is preferably from 0.5 to 15% by weight, more preferably from 1 to 10% by weight, most preferably from 2 to 8% by weight, the residual moisture content being determined by the EDANA (European Disposables and Nonwovens Association) recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight, most preferably from 40 to 60% by weight. Optionally, it is, however, also possible to use a fluidized bed dryer or a heated plowshare mixer for the drying operation.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm, very particularly from 300 to 500 µm. The mean particle size of the product fraction may be determined by means of the EDANA (European Disposables and Nonwovens Association) recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a mean particle size of at least 150 µm is preferably at least 90% by weight, more preferably at least 95% by weight, most preferably at least 98% by weight.

Polymer particles with too small a particle size lower the permeability (SFC). The proportion of excessively small polymer particles ("fines") should therefore preferably be small.

The proportion of particles with a particle size of at most 850 μm is preferably at least 90% by weight, more preferably at least 95% by weight, most preferably at least 98% by weight.

Polymer particles with too great a particle size lower the swell rate. The proportion of excessively large polymer particles should therefore likewise be small.

To further improve the properties, the polymer particles may be postcrosslinked. Suitable postcrosslinkers are compounds which comprise groups which can form covalent bonds with at least two carboxylate groups of the polymer particle. Suitable compounds are, for example, polyfunctional amines, polyfunctional amidoamines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, β-hydroxyalkylamides, as described in DE 102 04 938 A1 and U.S. Pat. No. 6,239,230.

Additionally described as suitable postcrosslinkers are cyclic carbonates in DE 40 20 780 C1, 2-oxazolidone and its derivatives, such as 2-hydroxyethyl-2-xazolidone, in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/031482 A1.

Preferred postcrosslinkers are ethylene carbonate, ethylene glycol diglycidyl ether, reaction products of polyamides with epichlorohydrin and mixtures of propylene glycol and 1,4-butanediol.

Very particularly preferred postcrosslinkers are 2-hydroxyethyloxazolidin-2-one, oxazolidin-2-one and 1,3-propanediol.

In addition, it is also possible to use postcrosslinkers which comprise additional polymerizable ethylenically unsaturated groups, as described in DE 37 13 601 A1.

The amount of postcrosslinker is preferably from 0.001 to 2% by weight, more preferably from 0.02 to 1% by weight, most preferably from 0.05 to 0.2% by weight, based in each case on the polymer particles.

In a preferred embodiment of the present invention, polyvalent cations are applied to the particle surface in addition to the postcrosslinkers before, during or after the postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, from 0.001 to 1.5% by weight, preferably from 0.005 to 1% by weight, more preferably from 0.02 to 0.8% by weight, based in each case on the polymer particles.

The postcrosslinking is typically performed in such a way that a solution of the postcrosslinker is sprayed onto the dried polymer particles. After the spraying, the polymer particles coated with postcrosslinker are dried thermally, and the postcrosslinking reaction can take place either before or during the drying.

The spraying of a solution of the postcrosslinker is preferably performed in mixers with moving mixing tools, such as screw mixers, disk mixers, plowshare mixers and paddle mixers. Particular preference is given to horizontal mixers such as plowshare mixers and paddle mixers, very particular preference to vertical mixers. Suitable mixers are, for example, Lodige mixers, Bepex mixers, Nauta mixers, Processall mixers and Schugi mixers. However, it is also possible to spray on the postcrosslinker solution in a fluidized bed.

The postcrosslinkers are typically used in the form of an aqueous solution. The content of nonaqueous solvent or total amount of solvent can be used to adjust the penetration depth of the postcrosslinker into the polymer particles.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio is preferably from 20:80 to 40:60.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a shelf dryer, a rotary tube oven or a heatable screw. It is particularly advantageous to mix and dry in a fluidized bed dryer.

Preferred drying temperatures are in the range from 100 to 250° C., preferably from 120 to 220° C., more preferably from 130 to 210° C., most preferably from 150 to 200° C. The preferred residence time at this temperature in the reaction mixer or dryer is preferably at least 10 minutes, more preferably at least 20 minutes, most preferably at least 30 minutes, and typically at most 60 minutes.

Subsequently, the postcrosslinked polymer particles can be classified again.

To further improve the properties, the postcrosslinked polymer particles can be coated or subsequently moistened. Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a moisture content of preferably from 0 to 15% by weight, more preferably from 0.2 to 10% by weight, most preferably from 0.5 to 8% by weight, the water content being determined by the EDANA (European Disposables and Nonwovens Association) recommended test method No. WSP 230.2-05 "Moisture Content".

The postcrosslinked water-absorbing polymer particles obtainable by the process according to the invention have a centrifuge retention capacity (CRC) of typically at least 20 g/g, preferably at least 22 g/g, preferentially at least 24 g/g, more preferably at least 26 g/g, most preferably from 30 to 32 g/g.

EXAMPLES

Example 1 (Comparative Example)

By continuously mixing water, 50% by weight sodium hydroxide solution and acrylic acid, acrylic acid/sodium acrylate solution was prepared, in such a way that the degree of neutralization was 72 mol %. The solids content of the monomer solution was 39% by weight. After the components had been mixed, the monomer solution was cooled continuously by a heat exchanger.

The polyethylenically unsaturated crosslinker used is 3-tuply ethoxylated glyceryl triacrylate. The amount used was 1.1 kg per t of monomer solution.

To initiate the free-radical polymerization, the following components were used: hydrogen peroxide (1 kg (0.25% strength by weight) per t of monomer solution), sodium peroxodisulfate (1.50 kg (30% strength by weight) per t of monomer solution), and ascorbic acid (15 kg (1% strength by weight) per t of monomer solution).

The throughput of the monomer solution was 18 t/h.

The individual components are metered continuously into a List Contikneter continuous kneader reactor of capacity 6.3 $m^3$ (from List, Arisdorf, Switzerland).

In addition, 900 kg/h of removed undersize with a particle size of less than 150 µm were metered into the middle of the reactor.

At the feed, the reaction solution had a temperature of 30° C. The reactor was operated at a shaft speed of 38 rpm. The residence time of the reaction mixture in the reactor was 15 minutes.

The monomer solution was inertized with 2.4 $m^3$ of nitrogen/h, and the nitrogen was metered into the kneading reactor together with the monomer solution. In addition, a further 96 $m^3$ of nitrogen/h were metered directly into the kneading reactor. This corresponded to a total inert gas volume flow of 15.6 $m^3$/h per $m^3$ of reactor volume. The power consumption of the kneader shafts was 72% of the maximum power consumption.

After polymerization and gel comminution, the aqueous polymer gel was dried on a forced air belt dryer. The residence time on the belt dryer was 37 minutes.

The dried hydrogel was ground and screened off to a particle size of from 150 to 850 µm. The dried polymer particles had a centrifuge retention capacity of 39 g/g.

Example 2 (Comparative Example)

The procedure of example 1 was repeated. Only the amount of nitrogen used to inertize the monomer solution was used. The inert gas volume flow was accordingly only 0.38 $m^3$/h per $m^3$ of reactor volume. The power consumption of the kneader shafts rose to 79% of the maximum power consumption. The experiment was stopped.

Example 3 (Comparative Example)

The procedure of example 1 was repeated. The amount of 3-tuply ethoxylated glyceryl triacrylate used was increased to 1.5 kg per t of monomer solution and the amount of undersize recycled was increased to 1000 kg/h. The power consumption of the kneader shafts was 72% of the maximum power consumption.

The dried polymer particles had a centrifuge retention capacity of 34.5 g/g.

Example 4

The procedure of example 3 was repeated. Only the amount of nitrogen used to inertize the monomer solution was used. The inert gas volume flow was accordingly only 0.38 $m^3$/h per $m^3$ of reactor volume. The power consumption of the kneader shafts was still 72% of the maximum power consumption.

The comparison of example 3 with example 4 demonstrates that the inert gas volume flow in the case of production water-absorbing polymer particles with low centrifuge retention capacity (CRC) has no influence on the power consumption of the kneader shafts.

The invention claimed is:

1. A process for producing water-absorbing polymer particles by polymerizing a monomer solution or suspension comprising
   a) at least one ethylenically unsaturated monomer which bears acid groups and optionally is at least partly neutralized,
   b) at least one crosslinker,
   c) at least one initiator,
   d) optionally one or more ethylenically unsaturated monomers copolymerizable with the monomers specified under a) and
   e) optionally one or more water-soluble polymers, in a continuous kneading reactor having at least two axially parallel shafts under an inert gas stream, wherein an inert gas volume flow is at most 10 $m^3$/h per $m^3$ of reactor volume and homogeneously crosslinked water-absorbing polymer particles obtained by the polymerization have a centrifuge retention capacity of at most 38 g/g.

2. The process according to claim 1, wherein the reactor volume of the kneading reactor is from 1 to 10 $m^3$.

3. The process according to claim 1, wherein the monomer solution or suspension is transported through the kneading reactor in axial direction.

4. The process according to claim 1, wherein the inert gas is nitrogen.

5. The process according to claim 1, wherein the inert gas volume flow is metered into the kneading reactor at least partly via a common feed line with the monomer solution or suspension.

6. The process according to claim 1, wherein the inert gas volume flow is metered into the kneading reactor via a common feed line with the monomer solution or suspension.

7. The process according to claim 1, wherein the monomer solution, based on the monomer a), comprises from 0.001 to 0.013% by weight of at least one hydroquinone monoether.

8. The process according to claim 1, wherein the polymerization is a redox polymerization.

9. The process according to claim 8, wherein a reducing agent is metered into the kneading reactor separately from the monomer solution or suspension.

10. The process according to claim 1, wherein the water-absorbing polymer particles are postcrosslinked.

11. The process according to claim 1, wherein the inert gas volume flow is 0.001 to 5 $m^3$/h per $m^3$ of reactor volume.

12. The process according to claim 1, wherein the inert gas volume flow is 0.01 to 2.5 $m^3$/h per $m^3$ of reactor volume.

13. The process according to claim 1, wherein the inert gas volume flow is 0.1 to 2 $m^3$/h per $m^3$ of reactor volume.

14. The process according to claim 1, wherein the centrifuge retention capacity is at most 36.5 g/g.

15. The process according to claim 1, wherein the centrifuge retention capacity is at most 35.5 g/g.

* * * * *